(12) United States Patent
Zhang et al.

(10) Patent No.: US 12,400,445 B2
(45) Date of Patent: Aug. 26, 2025

(54) AUGMENTED REALITY OPERATING PROCEDURE JUDGMENT SYSTEM, AUGMENTED REALITY OPERATING PROCEDURE JUDGMENT METHOD, AND AUGMENTED REALITY OPERATING PROCEDURE JUDGMENT DEVICE

(71) Applicant: Wistron Corp., New Taipei (TW)

(72) Inventors: Jia-Hong Zhang, New Taipei (TW); Yi-Yun Hsieh, New Taipei (TW); Shih-Wei Wang, New Taipei (TW); Chia-Feng Kuo, New Taipei (TW)

(73) Assignee: WISTRON CORP., New Taipei (TW)

( * ) Notice: Subject to any disclaimer, the term of this patent is extended or adjusted under 35 U.S.C. 154(b) by 302 days.

(21) Appl. No.: 18/192,106

(22) Filed: Mar. 29, 2023

(65) Prior Publication Data
US 2024/0193940 A1 Jun. 13, 2024

(30) Foreign Application Priority Data

Dec. 13, 2022 (TW) .................................. 111147732

(51) Int. Cl.
*G06V 20/20* (2022.01)
*G06V 10/774* (2022.01)

(52) U.S. Cl.
CPC ............ *G06V 20/20* (2022.01); *G06V 10/774* (2022.01)

(58) Field of Classification Search
CPC ...... G06V 20/20; G06V 10/774; G06V 10/82; G06N 3/08
See application file for complete search history.

(56) References Cited

U.S. PATENT DOCUMENTS

| 2017/0323062 A1 | 11/2017 | Djajadiningrat et al. |
| 2018/0247023 A1* | 8/2018 | Divine .................... G16H 20/40 |
| 2019/0278263 A1* | 9/2019 | Mason ................... B60W 40/09 |
| 2021/0142097 A1* | 5/2021 | Zheng .................... G06V 10/761 |
| 2022/0327318 A1 | 10/2022 | Radhakrishnan et al. |
| 2024/0193412 A1* | 6/2024 | Bai ........................... G06N 3/08 |

FOREIGN PATENT DOCUMENTS

| CN | 205563458 U | 9/2016 |
| CN | 106325494 A | 1/2017 |
| CN | 106569769 A | 4/2017 |
| CN | 107004044 A | 8/2017 |
| CN | 110728670 A | 1/2020 |
| CN | 113823129 A | 12/2021 |

OTHER PUBLICATIONS

Chinese language office action dated Sep. 15, 2023, issued in application No. TW 111147732.

* cited by examiner

*Primary Examiner* — Jitesh Patel
(74) *Attorney, Agent, or Firm* — McClure, Qualey & Rodack, LLP

(57) ABSTRACT

An augmented reality operating procedure judgment system is provided. The augmented reality operating procedure judgment system includes an augmented reality device and a processor. The augmented reality device receives a plurality of real-time images. The processor accesses an inference model stored in a storage device. The processor judges a standard operating procedure (SOP) result corresponding to the plurality of real-time images through the inference model. The augmented reality device displays the standard operating procedure result on one of the plurality of real-time images. Therefore, the effect of judging whether an operator is following the standard operating procedure may be achieved.

18 Claims, 8 Drawing Sheets

100

AUGMENTED REALITY OPERATING PROCEDURE JUDGMENT SYSTEM, AUGMENTED REALITY OPERATING PROCEDURE JUDGMENT METHOD, AND AUGMENTED REALITY OPERATING PROCEDURE JUDGMENT DEVICE

CROSS REFERENCE TO RELATED APPLICATIONS

This Application claims priority of Taiwan Patent Application No. 111147732, filed on Dec. 13, 2022, the entirety of which is incorporated by reference herein.

BACKGROUND OF THE INVENTION

Field of the Invention

The present disclosure relates to an inference model applied to a standard operating procedures (SOP), and, in particular, to an augmented reality operating procedure judgment system, an augmented reality operating procedure judgment method, and an augmented reality operating procedure judgment device.

Description of the Related Art

In factory production, medical emergency management, and many other professional endeavors, standard operating procedures (SOP) are formulated based on past experience to ensure the correct operation of equipment and the correct actions performed by personnel. The goal is to maintain high levels of quality, efficiency, and safety. In addition to practicing the content of SOP manuals, current SOP training for personnel still relies on the personal guidance of experienced senior personnel to assess the effectiveness of learning, which takes time and effort on the part of senior personnel, for both new learning and old review.

If there is a recognition system that can review compliance with SOP operations instead of having senior personnel shoulder this responsibility (for example, the concept of virtual digital coaches is provided to replace human coaches), it will save precious human resources.

However, this behavior recognition system generally uses a camera that is set up additionally and performs recognition through a video from a third-person perspective, which is likely to affect the accuracy of judgment due to different shooting angles. Moreover, the recognition result cannot be fed back to the operator in real time. Thus, its practicability is greatly reduced.

Therefore, how to provide an accurate inference model for judging whether an operator is following standard operating procedures and how to perform recognition through a video from a first-person perspective has become one of the problems to be solved in this field.

BRIEF SUMMARY OF THE INVENTION

In order to solve the above problem, one aspect of the present disclosure provides an augmented reality operating procedure judgment system. The augmented reality operating procedure judgment system comprises an augmented reality device and a processor. The augmented reality device receives a plurality of real-time images. The processor accesses an inference model stored in a storage device. The processor judges a standard operating procedure (SOP) result corresponding to the plurality of real-time images through the inference model. The augmented reality device displays the standard operating procedure result on one of the plurality of real-time images.

In an embodiment, the processor receives a plurality of pieces of positive sample data. The processor splits the plurality of pieces of positive sample data into a plurality of video segments according to a specific time length. The processor exchanges any two adjacent video segments of the plurality of video segments to obtain a plurality of pieces of negative sample data. The processor inputs the plurality of pieces of positive sample data or the plurality of pieces of negative sample data into the inference model for training.

In an embodiment, before the processor inputs the plurality of pieces of positive sample data or the plurality of pieces of negative sample data into the inference model for training, the processor performs a mask process on the plurality of pieces of positive sample data or the plurality of pieces of negative sample data through a sliding window. The mask process refers to leaving frames blank or filling frames black. The processor generates a plurality of pieces of sub-sample data in chronological order. Each piece of sub-sample data includes frames in the sliding window. Time corresponding to the frames in the sliding window included in one piece of sub-sample data is different from time corresponding to the frames in the sliding window included in the other pieces of sub-sample data. The mask process is performed on the other frames, which are not in the sliding window, in the pieces of sub-sample data.

In an embodiment, each time the augmented reality device receives one of the plurality of real-time images, the processor accumulates the received real-time images. In response to the number of accumulated real-time images reaching a predetermined frame number, the processor inputs the accumulated real-time images into the inference model, and the inference model outputs the standard operating procedure result.

In an embodiment, the standard operating procedure result output by the inference model MD comprises a result indicating a correct operation, a result indicating an incorrect operation, or a result indicating insufficient judgment (keep going).

In an embodiment, after the processor processes the plurality of pieces of negative sample data and the plurality of pieces of positive sample data by data augmentation or processes the plurality of pieces of sub-sample data that correspond to the plurality of pieces of negative sample data and the plurality of pieces of positive sample data by the data augmentation, the processor inputs the pieces of negative sample data and the pieces of positive sample data that have been processed by the data augmentation into the inference model, or the processor inputs the pieces of sub-sample data that correspond to the plurality of pieces of negative sample data and the plurality of pieces of positive sample data and have been processed by the data augmentation into the inference model.

In an embodiment, the data augmentation comprises augmentation of temporal translation that is performed to randomly translate a temporal position of each frame of at least one of the plurality of video segments.

In an embodiment, the data augmentation comprises augmentation of temporal zooming that is performed to randomly speed up or slow down video content of at least one of the plurality of video segments.

Another aspect of the present disclosure provides an augmented reality operating procedure judgment method. The augmented reality operating procedure judgment method comprises the following steps: through an augmented reality device, receiving a plurality of real-time images; and, through a processor, accessing an inference model stored in a storage device. The processor judges a standard operating procedure (SOP) result corresponding to the plurality of real-time images through the inference model. The augmented reality device displays the standard operating procedure result on one of the plurality of real-time images.

In an embodiment, the augmented reality operating procedure judgment method further comprises the following steps: through the processor, receiving a plurality of pieces of positive sample data; through the processor, splitting the plurality of pieces of positive sample data into a plurality of video segments according to a specific time length; through the processor, exchanging any two adjacent video segments of the plurality of video segments to obtain a plurality of pieces of negative sample data; and through the processor, inputting the plurality of pieces of positive sample data or the plurality of pieces of negative sample data into the inference model for training.

In an embodiment, before, through the processor, inputting the plurality of pieces of positive sample data or the plurality of pieces of negative sample data to the inference model for training, the augmented reality operating procedure judgment method further comprises the following steps: through the processor, performing a mask process on the plurality of pieces of positive sample data or the plurality of pieces of negative sample data through a sliding window. The mask process refers to leaving frames blank or filling frames in black. The plurality pieces of sub-sample data are generated in chronological order. Each piece of sub-sample data includes frames in the sliding window. Time corresponding to the frames in the sliding window included in one piece of sub-sample data is different from time corresponding to the frames in the sliding window included in the other pieces of sub-sample data. The mask process is performed on the other frames, which are not in the sliding window, in the pieces of sub-sample data.

In an embodiment, in response to the plurality of pieces of negative sample data being split into N video segments, the processor generates N−1 pieces of negative sample data, N is a positive integer.

In an embodiment, each time the augmented reality device receives one of the plurality of real-time images, the processor accumulates the received real-time images. In response to the number of accumulated real-time images reaching a predetermined frame number, the processor inputs the accumulated real-time images into the inference model, and the inference model outputs the standard operating procedure result.

In an embodiment, the standard operating procedure result output by the inference model MD comprises a result indicating a correct operation, a result indicating an incorrect operation, or a result indicating insufficient judgment (keep going).

In an embodiment, after the processor processes the plurality of pieces of negative sample data and the plurality of pieces of positive sample data by data augmentation or processes the plurality of pieces of sub-sample data that correspond to the plurality of pieces of negative sample data and the plurality of pieces of positive sample data by the data augmentation, the processor inputs the pieces of negative sample data and the pieces of positive sample data that have been processed by the data augmentation into the inference model, or the processor it inputs the pieces of sub-sample data that correspond to the plurality of pieces of negative sample data and the plurality of pieces of positive sample data and have been processed by the data augmentation into the inference model.

In an embodiment, the data augmentation comprises augmentation of temporal translation that is performed to randomly translate a temporal position of each frame of at least one of the plurality of video segments.

In an embodiment, the data augmentation comprises augmentation of temporal zooming that is performed to randomly speed up or slow down a video content of at least one of the plurality of video segments.

In an embodiment, the plurality of pieces of sub-sample data comprise first sub-sample data and second sub-sample data. A first time interval of a first sliding window corresponding to the first sub-sample data overlaps a second time interval of a second sliding window corresponding to the second sub-sample data by M seconds. M is a positive integer, and M seconds is less than the first time interval. A length of the first time interval is the same as a length of the second time interval, and a starting point of the second time interval is later than a starting point of the first time interval.

Another aspect of the present disclosure provides an augmented reality operating procedure judgment device. The augmented reality operating procedure judgment device comprises augmented reality glasses and a processor. The augmented reality glasses receive a plurality of real-time images. The processor accesses an inference model stored in a storage device. The processor judges a standard operating procedure (SOP) result corresponding to the plurality of real-time images through the inference model. The augmented reality glasses display the standard operating procedure result on one of the plurality of real-time images.

In an embodiment, the processor receives a plurality of pieces of positive sample data, splits the plurality of pieces of positive sample data into a plurality of video segments according to a specific time length, exchanges any two adjacent video segments of the plurality of video segments to obtain a plurality of pieces of negative sample data, and inputs the plurality of pieces of positive sample data or the plurality of pieces of negative sample data into the inference model for training. In another embodiment, before the processor inputs the plurality of pieces of positive sample data or the plurality of pieces of negative sample data into the inference model for training, the processor performs a mask process on the plurality of pieces of positive sample data or the plurality of pieces of negative sample data through a sliding window. The mask process refers to leaving frames blank or filling frames in black. The processor generates a plurality of pieces of sub-sample data in chronological order. Each piece of sub-sample data includes frames in the sliding window. Time corresponding to the frames in the sliding window included in one piece of sub-sample data is different from time corresponding to the frames in the sliding window included in the other pieces of sub-sample data. The mask process is performed on the other frames, which are not in the sliding window, in the pieces of sub-sample data.

The augmented reality operating procedure judging system and the augmented reality operating procedure judging method described in the embodiments increase the number of negative samples in the SOP. In the cases where the amount of positive sample data and the amount of negative sample data are sufficient, the training of the inference model is more accurate. In addition, through the application of the augmented reality device, real-time images from the user's first-person perspective can be collected to avoid affecting the accuracy of training the inference model due to different shooting angles. The processor can train the inference model using these real-time images, which may greatly improve training quality and accuracy.

On the other hand, the inference model that has been trained can also instantly judge whether the user is operating according to an SOP. A recognition result is generated and fee back to the operator in real time, which greatly increases the practicability.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It must be understood that the terms "comprises," "comprising," "includes" and/or "including," in the present disclosure are used to indicate the existence of specific technical features, values, method steps, operation processes, components, and/or components, but do not exclude that more technical features, values, method steps, operation processes, components, components, or any combination of the above can be added.

Use of ordinal terms such as "first", "second", "third", etc., in the claims to modify a claim element does not by itself connote any priority, precedence, or order of one claim element over another, or the temporal order in which acts of a method are performed, but are used merely as labels to distinguish one claim element having a certain name from another element having the same name.

Figure 1:
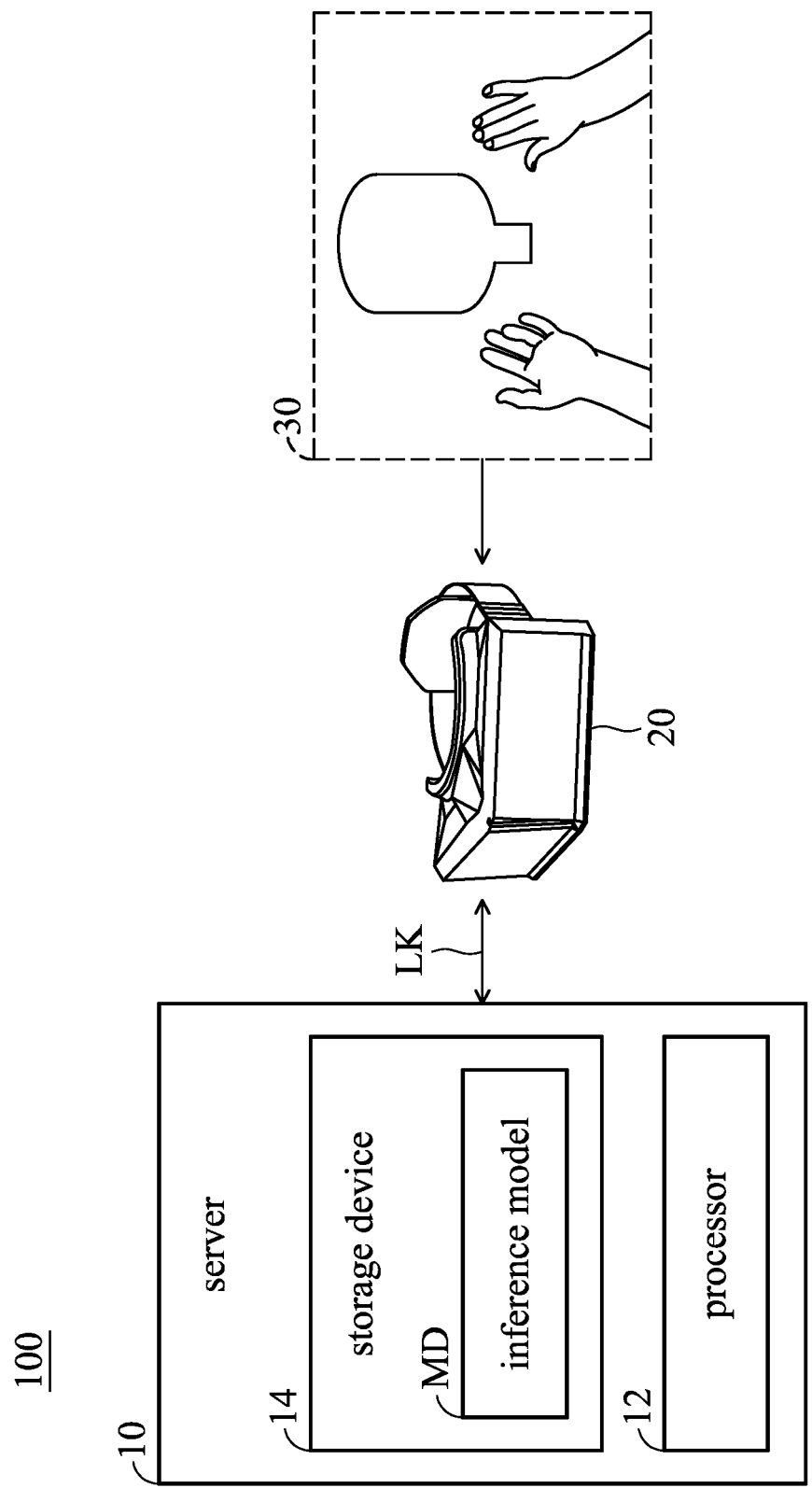
FIG. 1 is a block diagram of an augmented reality operating procedure judgment system according to an embodiment of the present disclosure.
Figure 2A:
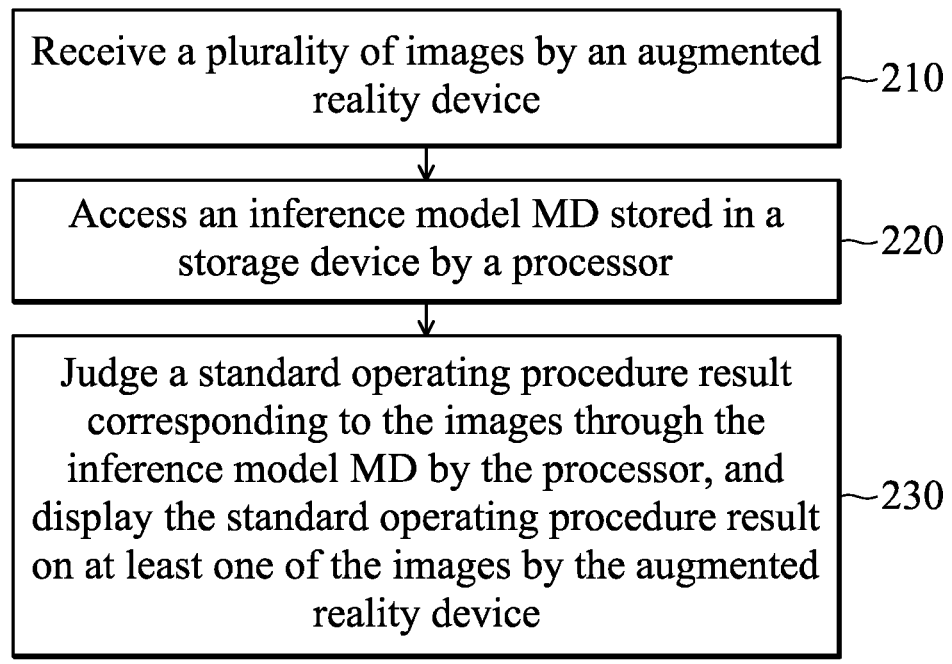
FIG. 2A is a flow chart of an augmented reality operating procedure judgment method according to one embodiment of the present disclosure.
Figure 2B:
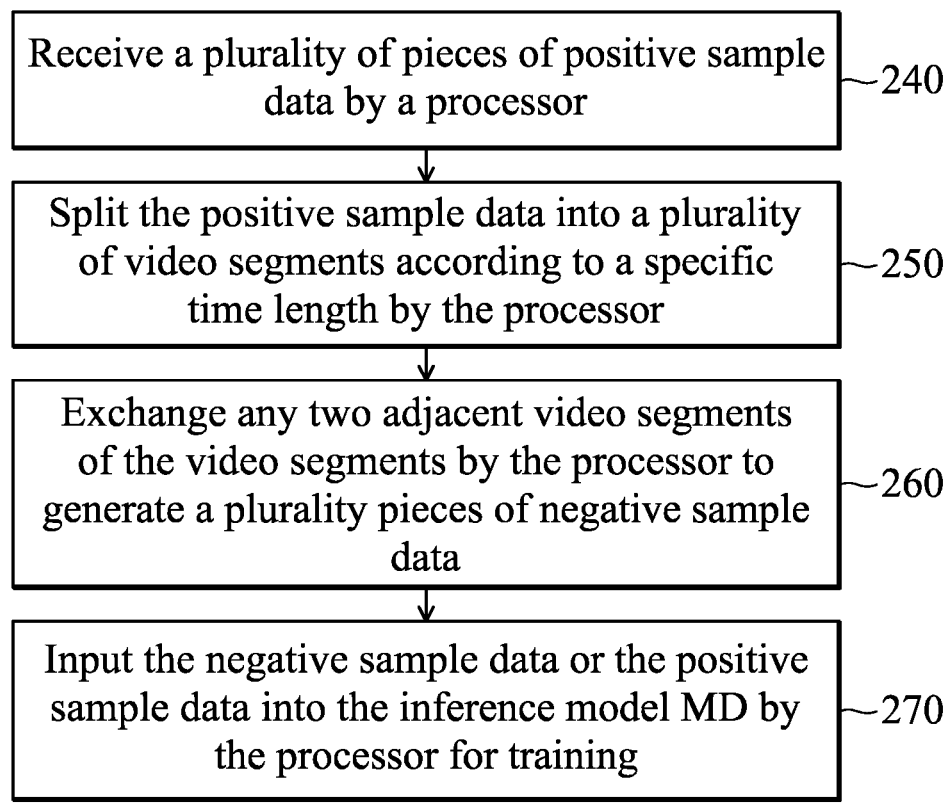
FIG. 2B is a flow chart of an augmented reality operating procedure judgment method according to another embodiment of the present disclosure.

Please refer to FIGS. 1-2, FIG. 1 is a block diagram of an augmented reality operating procedure judgment system 100 according to an embodiment of the present disclosure, FIG. 2A is a flow chart of an augmented reality operating procedure judgment method 200 according to one embodiment of the present disclosure, and FIG. 2B is a flow chart of an augmented reality operating procedure judgment method 200' according to another embodiment of the present disclosure. In an embodiment, the augmented reality operating procedure judgment methods 200 and 200' can be implemented by the augmented reality operating procedure judgment system 100.

The augmented reality operating procedure judgment system 100 shown in FIG. 1 comprises a server 10 and an augmented reality device 20. The server 10 can be implemented by a virtual machine built on a desktop computer, a notebook, or a host operation system.

In an embodiment, the communication link LK is established between the server 10 and the augmented reality device 20 in a wired or wireless manner.

In an embodiment, when the performance of the computing device (for example, the processor) in the augmented reality device 20 is sufficient and the capacity of the storage device (not shown in the figures) in the augmented reality device 20 is sufficient, then the inference model MD can be trained in the augmented reality device 20, and the inference model MD can be executed in the augmented reality device 20. Therefore, the augmented reality device 20 does not need to establish a communication link with the server 10.

In an embodiment, the functions of the server 10 can be implemented by hardware circuits, chips, firmware, or software.

In an embodiment, the server 10 comprises a processor 12 and a storage device 14. In an embodiment, the server 10 further comprises a display (not shown in the figures).

In an embodiment, the processor 12 may be implemented by a microcontroller, a microprocessor, a digital signal processor, an application specific integrated circuit (ASIC), or a logic circuit.

In an embodiment, the storage device 14 can be realized by a read-only memory, a flash memory, a floppy disk, a hard disk, an optical disk, a flash drive, a tape, a network accessible database, or storage medium with the same function that is known to those skilled in the art.

In an embodiment, the augmented reality device 20 may be augmented reality (AR) glasses or mixed reality (MR) glasses. The AR glasses operate with a projection or camera to project virtual elements on the screen of the display, and the screen of the display can display the surrounding environment and the virtual elements at the same time. The MR glasses can perform more combinations and connections of virtual scenes with the real world, and generate interactions. This allows the user to see the modified design draft and watch virtual TV programs, etc. In the MR glasses, the user can change the virtual world through actions in the real world.

In an embodiment, the processor 12 is used to access the inference model MD stored in the storage device 14 so as to accomplish the augmented reality operating procedure judgment methods 200 and 200'.

In an embodiment, the inference model MD can be implemented by a known convolutional neural network (CNN), a two-dimensional convolutional neural network, a two-dimensional convolutional neural network with a concatenate operation, a two-dimensional convolutional neural network with a recurrent neural network (RNN), or a three-dimensional convolutional neural network. However, those others skilled in the art should know that the implementation of the inference model MD is not limited to the above, and the inference model MD can be implemented by other similar neural networks used for image recognition.

In an embodiment, the function of the inference model MD can be implemented by hardware (circuit/chip), software, or firmware. The inference model MD can be applied to an analysis having a standard operating procedure (SOP) to judge whether the user is operating according to the SOP. For example, the inference model MD can be applied to intubation preparation, intubation rescue, equipment assembly, maintenance, and/or operations for general electronic devices. Generally, when a user operates an action involving an SOP, it is relatively easy to obtain positive sample data. It may be that mistakes are made by novices or happened occasionally. Therefore, it is relatively difficult to obtain negative sample data. Accordingly, the generation of sample data is particularly important in training the inference model MD. The augmented reality operating procedure judgment method 200 will be described in detail below, as shown in FIG. 2A.

In Step 210, an augmented reality device 20 receives a plurality of images 30.

In an embodiment, the images 30 may be a dynamic movie, and the movie is composed of a plurality of frames.

In an embodiment, these images 30 may be real-time and ongoing videos, such as videos related to intubation preparation, intubation rescue, equipment assembly, maintenance, and/or operations for general electronic devices. For example, during the intubation preparation, the augmented reality device 20 captures the images 30 related to a nurse preparing a laryngoscope, preparing an endotracheal tube, and/or assist a patient to be a posture, etc.

With the application of the augmented reality device 20, a user can observe information in time and collect user information in real time through an immersive experience. The problem induced by the blind angle of the third-person camera is avoided, and an additional camera is not required to provide an image input. Therefore, the augmented reality operating procedure judgment system 100 is flexible and more adaptable to applications in different industries and scenarios.

In Step 220, the processor 12 accesses the inference model MD stored in the storage device 14. The inference model MD can be applied to an analysis having a standard operating procedures (SOP) to judge whether the user is operating according to the SOP.

In Step S230, the processor 12 judges a standard operating procedure result corresponding to the images 30 through the inference model MD, and the augmented reality device 20 displays the standard operating procedure result on at least one of the images 30.

In an embodiment, the inference model MD outputs the standard operating procedure result corresponding to the images 30 according to the images 30, and the augmented reality device 20 judges whether an operation situation is correct according to the standard operating procedure result so as to generate a judgment result. Every predetermined number of frames (for example, every 30 frames), the processor displays an icon corresponding to the judgment result on at least one of the images 30 (for example, the $30^{th}$ to $32^{nd}$ frames). In an embodiment, when the judgment result indicates that the operation is correct, the icon can be a symbol "O" or text "OK"; when the judgment result indicates that the operation is incorrect, the icon can be a symbol "X" or text "ERROR". However, the styles of the icons are not limited as long as the operator can understand whether the operation is correct based on the icons.

In addition, in an embodiment, the augmented reality operating procedure judgment method 200 is described in detail, as shown in FIG. 2B. In the embodiment, the processor may first perform the steps of the augmented reality operating procedure judgment method 200' to obtain the trained inference model MD and then perform the steps of the augmented reality operating procedure judgment method 200 through the trained inference model MD.

In Step 240, a processor 12 receives a plurality of pieces of positive sample data. The positive sample data can be the images 30 from the augmented reality device 20.

Generally, when a user operates an action involving an SOP, as long as the user conform to the SOP, the operation can be performed smoothly (there is only a small probability of occurring operation errors). Thus, it is relatively easy to obtain positive sample data. In the step, the images 30 are regarded as the pieces of positive sample data.

Figure 3A:
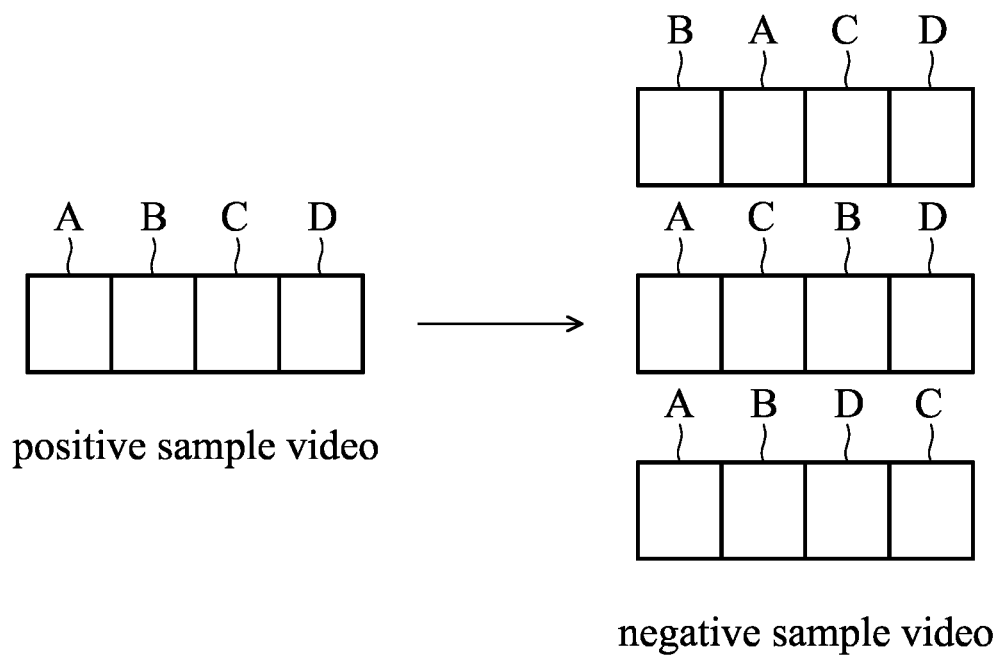
FIG. 3A is a schematic diagram showing a method for generating negative sample data according to an embodiment of the present disclosure.

However, when the inference model MD is trained, a plurality pieces of positive sample data and a plurality pieces of negative sample data are required. Therefore, in subsequent steps, the processor 12 generates a plurality pieces of negative sample data, for example, as shown in FIG. 3A. FIG. 3A is a schematic diagram showing a method 300 for generating negative sample data according to an embodiment of the present disclosure.

In Step 250, the processor 12 splits the positive sample data into a plurality of video segments according to a specific time length.

As shown in FIG. 3A, for example, the processor 12 splits a 12-second positive sample video (OK video) into segments every 3 seconds. The positive sample data can be split into 4 video segments A-D in sequence.

In Step 260, the processor 12 exchanges any two adjacent video segments of the video segments to generate a plurality pieces of negative sample data. For example, the processor 12 selects two adjacent video segments from these video segments and exchanges the two selected video segments to generate first negative sample data and further exchanges two other adjacent video segments of these video segments to generate second negative sample data. The present disclosure is not limited thereto, however.

In an embodiment, the processor 12 averagely splits a video of 1 to 2 minutes into 16 segments and then exchanges adjacent video segments to generate negative sample data. The time of each video segment is in a range of about 3 to 8 seconds.

As shown in FIG. 3A, for example, the processor 12 splits a 12-second positive sample video (OK video) into segments every 3 seconds. The positive sample data can be split into 4 video segments A-D in sequence. Because the wrong order of actions in the SOP is regarded as a wrong operation, the order of the video segments is important. Therefore, the processor 12 splits the positive sample data into several small segments (for example, 4 video segments A-D in sequence) in chronological order and exchanges two adjacent video segments to generate negative sample data. For example, the video segment A is exchanged with the video segment B (regarded as first negative sample data), the video segment B is swapped with the video segment C (regarded as second negative sample data), and the video segment C is swapped with the video segment D (regarded as third negative sample data), thereby obtaining three negative sample videos (NG videos).

In an embodiment, once the negative sample data is generated, the processor 12 will mark the wrong time point (that is, the adjacent exchanged video segments) and store it in the storage device 14.

If two non-adjacent video segments are exchanged, the connection between videos will be unnatural. The processor 12 will record the time when two adjacent video segments of each piece of negative sample data are exchanged so that whether this piece of negative sample data is wrong can be known. For example, the processor 12 stores the following information in the storage device 14: the first negative sample data is obtained by exchanging the video segment A and the video segment B (the time from the video segment A to the video segment B is recorded), and the video segments C and D are not changed. The information related to the second negative sample data and the third negative sample data is present in the same way as the information related to the first negative sample data and also recorded in the storage device 14. The processor 12 record all patterns of the generated negative sample data into the storage device 14. Since the SOP is a series of operations, if there is a step error in sample data, the entire sample data will be regarded as negative sample data. Accordingly, the processor 12 can generate a plurality pieces of negative sample data.

In as embodiment, when the positive sample data is split into N video segments according to a specific time period, the processor 12 generates N−1 pieces of negative sample data. N is a positive integer.

For example, in FIG. 3A, the positive sample data is split into the video segments every 3 seconds. Thus, the positive sample data is split into 4 video segments, and the processor 12 generates 3 pieces of negative sample data. In this example, the value of N is 4.

In Step 270, the processor 12 inputs the negative sample data or the positive sample data into the inference model MD for training.

Since the above steps have obtained a plurality pieces of positive sample data and generated a plurality pieces of negative sample data, there is enough sample data to be input into the inference model MD so that the inference model MD can be trained.

In an embodiment, after the processor 12 processes the negative sample data and the positive sample data by data augmentation, the negative sample data that has been processed by the data augmentation and the positive sample data that has been processed by the data augmentation is input into the inference model MD.

In an embodiment, the data adjustment manners of the data augmentation includes random adjustment of brightness, adjustment of contrast, augmentation of hue and saturation, rotation, translation, shearing, zooming, augmentation of flipping, and others.

In an embodiment, the data augmentation may include augmentation of temporal translation. The augmentation of the temporal translation is performed to randomly translate the temporal position of each frame in the video.

The temporal translation of the data augmentation makes the entire video delayed or advanced randomly so as to make the inference model MD have certain adaptability for recognizing the occurrence time of the SOP actions, which prevents the inference model MD from inducing over fitting on the training data.

In an embodiment, the data augmentation may include augmentation of temporal zooming. The augmentation of temporal zooming is performed to randomly speed up or slow down the video content.

The temporal zooming of the data augmentation is provided to make the model adaptable to the speeds of the actions and prevent the model from inducing over fitting on the training data. Generally, the collection of training data for the model may only be operated by a specific user, and the user's actions are habitual. For example, there is habituation on the timing and speed of the operation performed by the user. Therefore, through the augmentation of the random temporal translation and zooming, when different users use this system, even if they have different operation timings and speeds, the inference model MD can still perform the recognition.

For example, negative sample data can be generated by exchanging video images of adjacent video segments. The generated negative sample data is stored once the exchanging is done. The temporal translation of the data augmentation makes the entire video delayed or advanced randomly so as to make the model have certain adaptability for recognizing the occurrence time of the SOP actions, which prevents the model from inducing over fitting on the training data and further prevents newly added negative sample data.

Figure 3B:
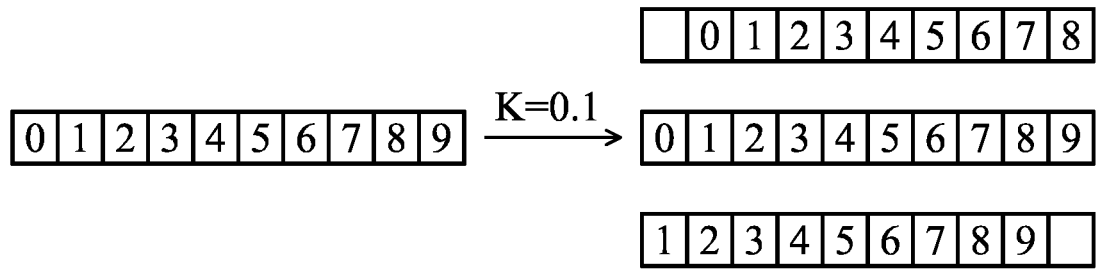
FIG. 3B is a schematic diagram showing temporal translation in data augmentation of video images according to an embodiment of the present disclosure.

For example, as shown in FIG. 3B, assume that there are totally 10 frames whose contents are numbers 0 to 9 (for example, the sequence of the original video images of these 10 frames is represented by (0, 1, 2, 3, 4, 5, 6, 7, 8, 9)). When the first data augmentation parameter K is equal to 0.1 (K=0.1), the original video shown on the left portion of FIG. 3B is randomly translated by −1 to 1 frame according to the time, and the cases shown on the right portion of FIG. 3B (that is, three sequences of video images: (_, 0, 1, 2, 3, 4, 5, 6, 7, 8), (0, 1, 2, 3, 4, 5, 6, 7, 8, 9), and (1, 2, 3, 4, 5, 6, 7, 8, 9, _), and the bottom line represents a blank image) are obtained for training. The strength of the first data augmentation parameter K can be controlled according to requirements and experiments. In an example of intubation preparation and rescue, the first data augmentation parameter K can be set to 0.1.

Figure 3C:
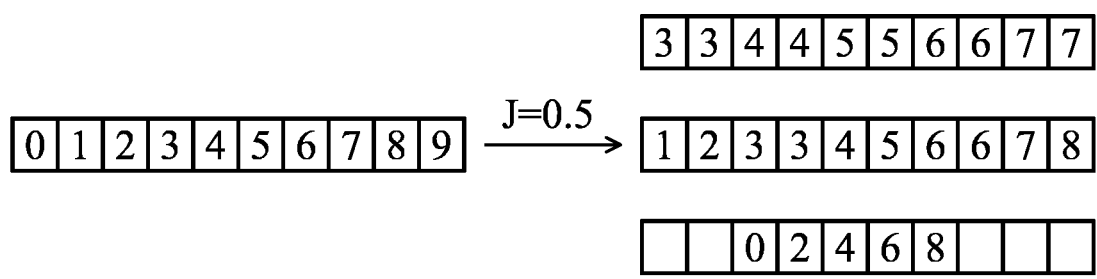
FIG. 3C is a schematic diagram showing temporal zooming in data augmentation of video images according to an embodiment of the present disclosure.

The temporal zooming of the data augmentation is provided to make the model adaptable to the speeds of the actions and prevent the model from inducing over fitting on the training data. The collection of training data for the model may only be operated by a specific user, and the user's actions are habitual. For example, there is habituation on the timing and speed of the operation performed by the user. Therefore, through the augmentation of the random temporal translation and zooming, when different users use this system, even if they have different operation timings and speeds, the model is still available. For example, as shown in FIG. 3C, assume that there are totally 10 frames whose contents are numbers 0 to 9 (for example, the sequence of the original video images of these 10 frames is represented by (0, 1, 2, 3, 4, 5, 6, 7, 8, 9)). When the second data augmentation parameter J is equal to 0.5 (J=0.5), the original video shown on the left portion of FIG. 3C is processed by down sampling or up sampling according to the time, thereby causing the playing speed of the video to be variable (for example, three sequences of video images (3, 3, 4, 4, 5, 5, 6, 6, 7, 7), (1, 2, 3, 3, 4, 5, 6, 6, 7, 8), and (_, _, 0, 2, 4, 6, 8, _, _, _). These three sequences are provided to the model for training. The strength of the second data augmentation parameter J can be controlled according to requirements and experiments. In an example of intubation preparation and rescue, the second data augmentation parameter J can be set to 0.5.

In different practical applications, the above-mentioned appropriate method for augmenting images and videos can be selected to help the inference model MD to perform the learning operation.

In an embodiment, when the inference model MD completes the predetermined number of epochs, the processor 12 regards the inference model MD as having completed the training phase.

In an embodiment, when the inference model MD is a model that has completed training, each time the augmented reality device 20 receives one of these images (such as real-time images), it sends it to the server 10. The server 10 accumulates these images (such as real-time images) until the number of accumulated images (for example, real-time images) reaches to a predetermined frame number (for example, images of 3 to 8 seconds). The, processor 10 inputs the accumulated images (for example, real-time images) into the inference model MD, and the inference model MD outputs a standard operating procedure (SOP) result.

In one embodiment, when the inference model MD is a model that has completed the training, the standard operating procedure result output by the inference model MD comprises a result indicating a correct operation, a result indicating an incorrect operation, or a result indicating insufficient judgment (keep going).

Figure 4C:
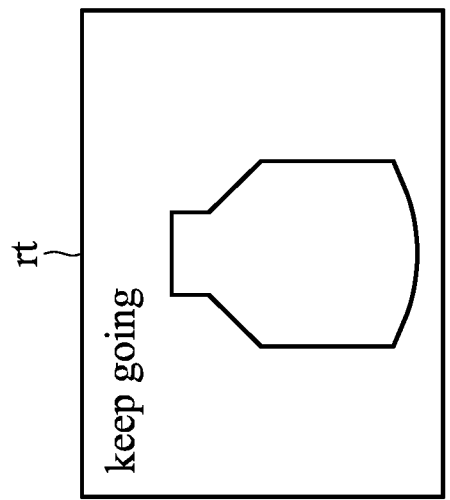
FIGS. 4A-4C are schematic diagrams showing a standard operating procedure result according to an embodiment of the present disclosure.
Figure 4B:
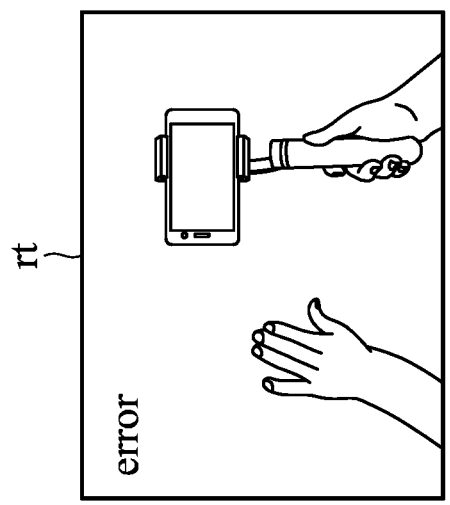
Figure 4A:
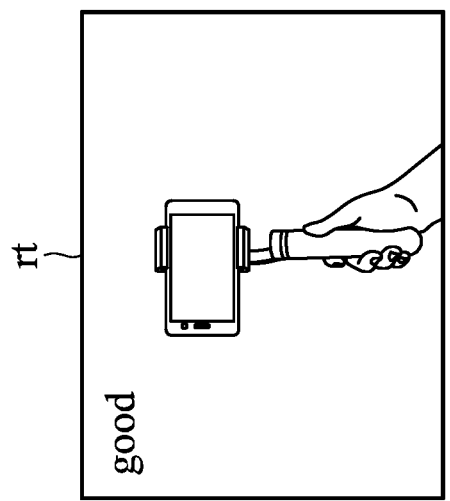

FIGS. 4A-4C are schematic diagrams showing the standard operating procedure result according to an embodiment of the present disclosure. For example, as shown in FIGS. 4A-4C, the inference model MD recognizes images (for example, real-time images) and outputs the standard operating procedure result rt including the result indicating the correct operation (shown as "good") in FIG. 4A, the result indicating the incorrect operation (shown as "error") in FIG. 4B, or the result indicating insufficient judgment (shown as "keep going") in FIG. 4C.

In an embodiment, the processor 12 superimposes the text corresponding to the output standard operating procedure result rt on the images (for example, real-time images), and the augmented reality device 20 displays the superimposed images as reference for the user in real time.

In an embodiment, assuming that each of FIGS. 4A-4C is a 3-second video with 30 frames per second. Then, the video of each of FIGS. 4A-4C includes 90 frames. In other words, the inference model MD outputs one standard operating procedure result rt every 3 seconds.

Accordingly, the user can input the images 30 provided by the augmented reality device 20 into the inference model MD, and then the inference model MD outputs one standard operating procedure result rt every 3 seconds such that the user can immediately know whether the operation is performed correctly based on the SOP.

In an embodiment, before the positive sample data or the negative sample data is input into the inference model MD for training, the processor 12 performs a mask process on the positive sample data or the negative sample data through a sliding window W0 and generates a plurality pieces of sub-sample data in chronological order. The pieces of sub-sample data include the frames in the sliding windows W1-W3 respectively. The time corresponding to the frames included in one piece of sub-sample data is different from the time corresponding to the frames included in any of the other pieces of sub-sample data.

In an embodiment, the mask process is performed on the other frames, which are not in the sliding windows, in the pieces of sub-sample data. The mask process refers to leaving frames blank or filling frames in black.

Figure 5:
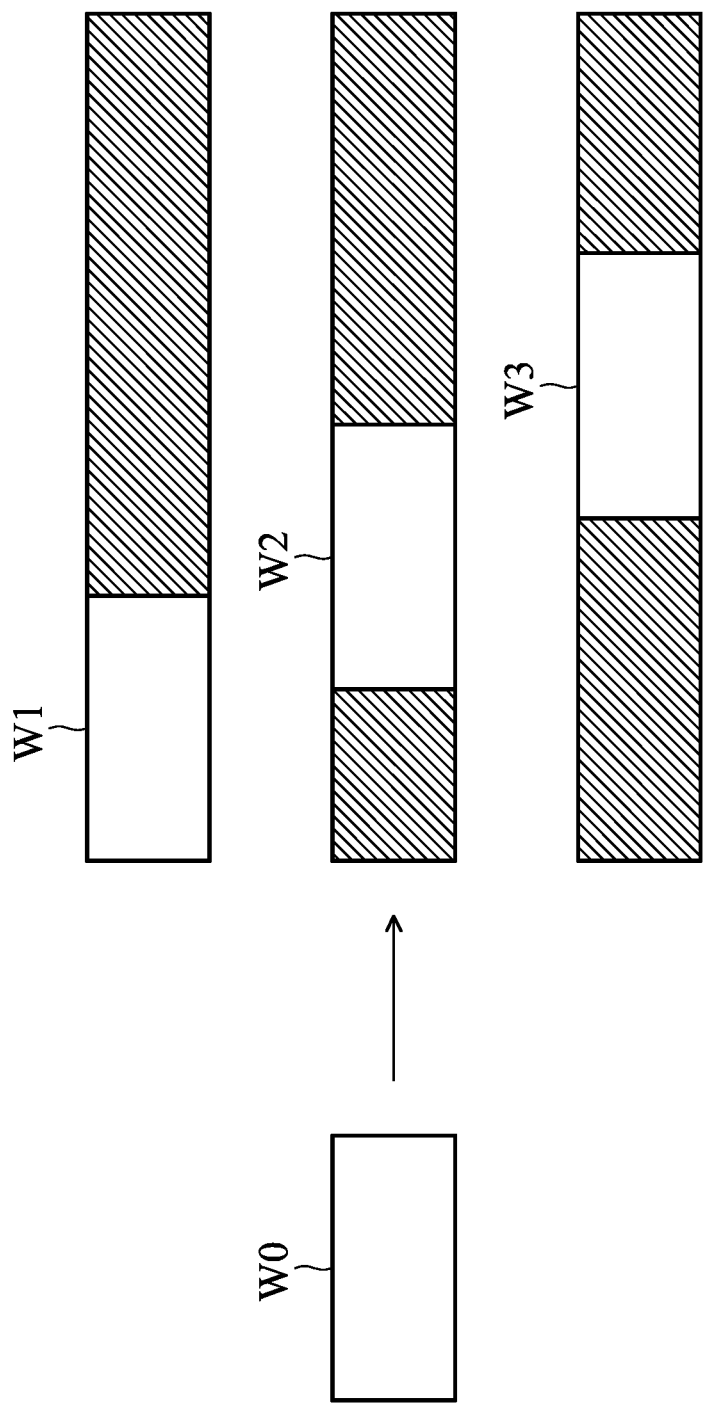
FIG. 5 is a schematic diagram showing sliding windows according to an embodiment of the present disclosure.

FIG. 5 is a schematic diagram showing sliding windows according to an embodiment of the present disclosure. For example, as shown in FIG. 5, Among the 3 pieces of sub-sample data (in the example, the sub-sample data is generated according to the positive sample data) generated by the processor 12 according to a video section, the sliding window W1 corresponding the first sub-sample data is located in the $1^{st}$ to $90^{th}$ frames, and the sliding window W2 corresponding to the second sub-sample data is located at the $30^{th}$ to $120^{th}$ frames, and the sliding window W3 corresponding to the third sub-sample data is located at the $60^{th}$ to $150^{th}$ frames. The size of each of the sliding windows W0-W3 is fixed at 90 frames, and each sliding window slides 30 frames each time. The frames outside the sliding windows W1-W3 are masked (that is, the processor 12 ignores the masked frames).

Accordingly, through the application of the sliding windows W1-W3, the video is cut into smaller units, thereby achieving the effect of reducing the amount of calculation of the processor 12 and enhancing the degree of accuracy of recognition of the inference model MD judging whether the video section conforms to the standard operating procedure.

In an embodiment, the plurality pieces of sub-sample data belong to the negative sample data. In this step, the sub-sample data where the corresponding sliding windows is located in the section marked by error is selected. For example, as shown in FIG. 5, in the example, 3 pieces of negative sample data that are generated by the processor 12 according to a video section correspond to the sub-sample data, the size of each of the sliding windows W0-W3 is 5 frames. The sliding window W1 of the first sub-sample data is located in the $1^{st}$ to $5^{th}$ frames, the sliding window W2 of the second sub-sample data is located in the $4^{th}$ to $8^{th}$ frames, and the sliding window W3 of the third sub-sample data is located in the $7^{th}$ to $11^{th}$ frames. The size of each of the sliding windows W0-W3 is fixed at 5 frames, and each of the sliding windows W0-W3 slides 3 frames each time. The frames marked as error are the $6^{th}$-$12^{th}$ frames (that is, the sliding window W3 of the third sub-sample data is in the section where the error is occurred). In response to the sliding window W3 of the third sub-sample data being located in the frames marked as error, the processor 12 processes the third sub-sample data and ignores the first sub-sample data and the second sub-sample data where the sliding windows has the frame not marked as error.

In an embodiment, these pieces of sub-sample data include first sub-sample data and second sub-sample data. The first time interval of the first sliding window W1 corresponding to the first sub-sample data overlaps the second time interval of the second sliding window W2 corresponding to the second sub-sample data by M seconds. M is a positive integer, and M seconds is less than the first time interval. The length of the first time interval is the same as the length of the second time interval, and the starting point of the second time interval is later than the starting point of the first time interval.

For example, the pieces of the sub-sample data include the first sub-sample data and the second sub-sample data. The time interval of the first sliding window W1 corresponding to the first sub-sample data is 1-5 seconds, and the time interval of the second sliding window W2 corresponding to the second sub-sample data is 3-7 seconds. The time interval of the sliding window W1 overlaps the time interval of the second sliding window W2 by 2 seconds (the overlapped time is from the $3^{rd}$ second to the $5^{th}$ second), and the overlapped time (2 seconds) is less than the time interval (5 seconds). The size of the first sliding window W1 is the same as the size of the second sliding window W2, and their corresponding time intervals are also the same (in the example, each of the time intervals is 5 seconds). If the number of frames displayed per second (that is, the frame rate (frame rate, fps)) is 30, then each of the first sliding window W1 and the second sliding window W2 includes 150 frames. The starting point of the first sliding window W1 is the first frame (that is, the first sliding window W1 starts from the first second), the starting point of the second sliding window W2 is the $90^{th}$ frame (that is, the second sliding window W2 starts from the $3^{rd}$ second).

In an embodiment, after the processor 12 processes the sub-sample data corresponding to the negative sample data and the positive sample data by data augmentation, the sub-sample data that corresponds to the negative sample data and the positive sample data and has been processed by the data augmentation is input into the inference model MD.

In an embodiment, the data augmentation may include augmentation of temporal translation. The augmentation of the temporal translation is performed to randomly translate the temporal position of each frame in the video.

In an embodiment, the data augmentation may include augmentation of temporal zooming. The augmentation of temporal zooming is performed to randomly speed up or slow down the video content.

Figure 6:
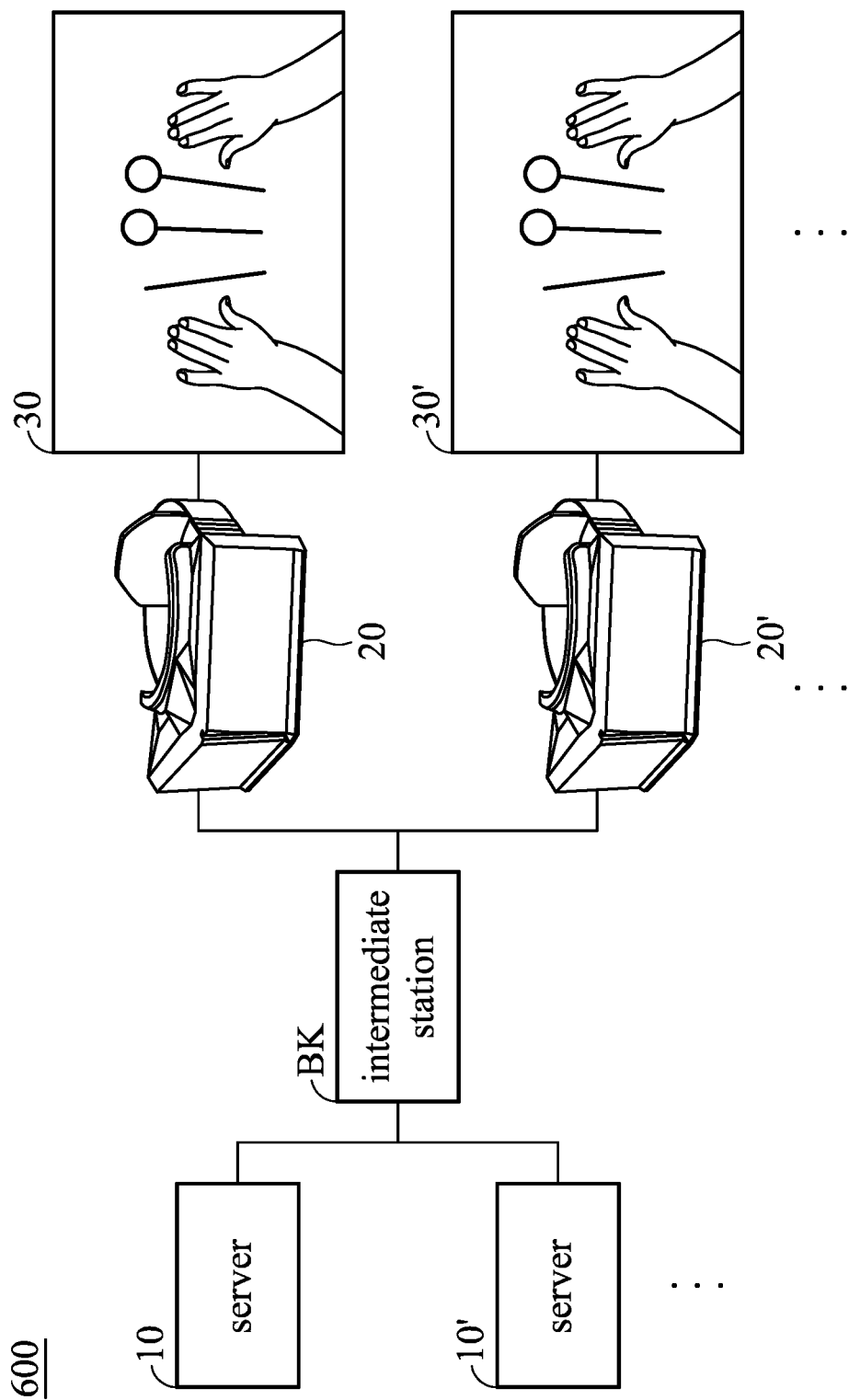
FIG. 6 is a schematic diagram showing an SOP operating recognition system for emergency intubation preparation and rescue according to an embodiment of the present disclosure.

FIG. 6 is a schematic diagram showing an SOP operating recognition system for emergency intubation preparation and rescue according to an embodiment of the present disclosure. Referring to FIG. 6, the SOP operating recognition system 600 for emergency intubation preparation and rescue is a slightly improved application of the augmented reality operating procedure judgment system 100 shown in FIG. 1. The SOP operating recognition system 600 for emergency intubation preparation and rescue uses multiple augmented reality devices (such as the augmented reality devices 20, 20') and multiple servers (such as servers 10 and 10'). The servers 10 and 10' shown in FIG. 6 are the same as the server 10 shown in FIG. 1, the augmented reality devices 20 and 20' shown in FIG. 6 are the same as the augmented reality device 20 shown in FIG. 1, and the real-time images 30 and 30' shown in FIG. 6 are conceptually the same as the real-time images 30 shown in FIG. 1. In the embodiment, the images 30 and 30' are images showing that a user performs intubation preparation or rescue operations. When the augmented reality device 20 shoots the real-time image 30, the augmented reality device 20 transmits the real-time image 30 to the intermediate station BK, and then the intermediate station BK transmits the real-time image 30 to the corresponding server 10. When the augmented reality device 20' shoots the real-time image 30', the augmented reality device 20' transmits the real-time image 30' to the intermediate station BK, and then the intermediate station BK transmits the real-time image 30' to the corresponding server 10'. In an embodiment, the system comprises multiple servers and multiple augmented reality devices.

In an embodiment, the inference model MD outputs a standard operating procedure result according to multiple images, and the augmented reality device 20 judges whether an operation situation is correct according to the standard operating procedure result so as to generate a judgment result. Every predetermined number of frames (for example, every 30 frames), the processor displays an icon corresponding to the judgment result on at least one of the images (for example, the $30^{th}$ to $32^{nd}$ frames). In an embodiment, when the judgment result indicates that the operation is correct, the icon can be a symbol "O" or text "OK"; when the judgment result indicates that the operation is incorrect, the icon can be a symbol "X" or text "ERROR". However, the styles of the icons are not limited as long as the operator can understand whether the operation is correct based on the icons.

When the servers 10 and 10' receive the real-time images 30 and 30', they input the real-time images 30 and 30' into their respective inference models MD. Each inference model MD (for example, the inference model MD in the server 10) outputs a standard operating procedure result (for example, "good" shown in FIG. 4A) according to the received real-time image (for example, the real-time image 30). The standard operating procedure result comprises a result indicating a correct operation, a result indicating an incorrect operation, or a result indicating insufficient judgment. In an embodiment, the inference model MD outputs one standard operating procedure result every specific time or every predetermined number of in-real images (for example, every 30 images), thereby informing the whether the user are operating correctly according to the SOP. In an embodiment, multiple AR devices subscribe to an inference service from the server 10 through channel registration in message queuing telemetry transport (MQTT), so the AR devices can obtain results and present them in real time.

The augmented reality operating procedure judging system and the augmented reality operating procedure judging method described in the embodiments increase the number of negative samples in the SOP. In the cases where the amount of positive sample data and the amount of negative sample data are sufficient, the training of the inference model is more accurate. In addition, through the application of the augmented reality device, real-time images from the user's first-person perspective can be collected to avoid affecting the accuracy of training the inference model due to different shooting angles. The processor can train the inference model using these real-time images, which may greatly improve training quality and accuracy.

On the other hand, the inference model that has been trained can also instantly judge whether the user is operating according to an SOP. A recognition result is generated and fee back to the operator in real time, which greatly increases the practicability.

The method of the present disclosure, or specific versions or portions thereof, may exist in the form of code. The code may be contained in physical media, such as floppy disks, optical discs, hard disks, or any other machine-readable (such as computer-readable) storage media, or not limited to external forms of computer program products. When the code is loaded and executed by a machine, such as a computer, the machine becomes a device for participating in the present invention. The code may also be transmitted through some transmission medium, such as wire or cable, optical fiber, or any type of transmission, wherein when the code is received, loaded, and executed by a machine, such as a computer, the machine becomes used to participate in the invented device. When implemented on a general-purpose processing unit, the code in conjunction with the processing unit provides a unique device that operates similarly to application-specific logic circuits.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An augmented reality operating procedure judgment system comprising:
   an augmented reality device receiving a plurality of real-time images; and
   a processor accessing an inference model stored in a storage device,
   wherein the processor judges a standard operating procedure (SOP) result corresponding to the plurality of real-time images through the inference model, and
   wherein the augmented reality device displays the standard operating procedure result on one of the plurality of real-time images,
   wherein the processor:
   receives a plurality of pieces of positive sample data;
   splits the plurality of pieces of positive sample data into a plurality of video segments according to a specific time length, wherein each video segments comprise a plurality of frames;
   exchanges any two adjacent video segments of the plurality of video segments to obtain a plurality of pieces of negative sample data; and
   inputs the plurality of pieces of positive sample data or the plurality of pieces of negative sample data into the inference model for training.

2. The augmented reality operating procedure judgment system of claim 1, wherein:
   before the processor inputs the plurality of pieces of positive sample data or the plurality of pieces of negative sample data into the inference model for training, the processor performs a mask process on the plurality of pieces of positive sample data or the plurality of pieces of negative sample data through a sliding window,
   the processor generates a plurality of pieces of sub-sample data in chronological order, each piece of sub-sample data includes frames in the sliding window, and time corresponding to the frames in the sliding window included in one piece of sub-sample data is different from time corresponding to the frames in the sliding window included in the other pieces of sub-sample data, and
   the mask process is performed on the other frames, which are not in the sliding window, in the pieces of sub-sample data, wherein the mask process refers to leaving the frames, which are not in the sliding window, blank or filling the frames, which are not in the sliding window, in black.

3. The augmented reality operating procedure judgment system of claim 1, wherein:
   each time the augmented reality device receives one of the plurality of real-time images, the processor accumulates the received real-time images, and
   in response to the number of accumulated real-time images reaching a predetermined frame number, the processor inputs the accumulated real-time images into the inference model, and the inference model outputs the standard operating procedure result.

4. The augmented reality operating procedure judgment system of claim 1, wherein the standard operating procedure result output by the inference model comprises a result indicating a correct operation, a result indicating an incorrect operation, or a result indicating insufficient judgment.

5. The augmented reality operating procedure judgment system of claim 2, wherein the processor processes the plurality of pieces of negative sample data and the plurality of pieces of positive sample data by a data augmentation or processes the plurality of pieces of sub-sample data that correspond to the plurality of pieces of negative sample data and the plurality of pieces of positive sample data by the data augmentation, and the processor inputs the pieces of negative sample data and the pieces of positive sample data that have been processed by the data augmentation into the inference model, or the processor inputs the pieces of sub-sample data that correspond to the plurality of pieces of negative sample data and the plurality of pieces of positive sample data and have been processed by the data augmentation into the inference model.

6. The augmented reality operating procedure judgment system of claim 5, wherein the data augmentation comprises augmentation of temporal translation that is performed to randomly translate a temporal position of each frame of at least one of the plurality of video segments.

7. The augmented reality operating procedure judgment system of claim 5, wherein the data augmentation comprises augmentation of temporal zooming that is performed to randomly speed up or slow down video content of at least one of the plurality of video segments.

8. An augmented reality operating procedure judgment method comprising:
   through an augmented reality device, receiving a plurality of real-time images; and
   through a processor, accessing an inference model stored in a storage device,
   wherein the processor judges a standard operating procedure (SOP) result corresponding to the plurality of real-time images through the inference model, and
   wherein the augmented reality device displays the standard operating procedure result on one of the plurality of real-time images,
   wherein the method further comprises:
   through the processor, receiving a plurality of pieces of positive sample data;
   through the processor, splitting the plurality of pieces of positive sample data into a plurality of video segments according to a specific time length, wherein each video segment comprises a plurality of frames;
   through the processor, exchanging any two adjacent video segments of the plurality of video segments to obtain a plurality of pieces of negative sample data; and
   through the processor, inputting the plurality of pieces of positive sample data or the plurality of pieces of negative sample data into the inference model for training.

9. The augmented reality operating procedure judgment method of claim 8, wherein before, through the processor, inputting the plurality of pieces of positive sample data or the plurality of pieces of negative sample data into the inference model for training, the augmented reality operating procedure judgment method further comprises:
   through the processor, performing a mask process on the plurality of pieces of positive sample data or the plurality of pieces of negative sample data through a sliding window,
   wherein a plurality of pieces of sub-sample data are generated in chronological order, each piece of sub-sample data includes frames in the sliding window, and time corresponding to the frames in the sliding window included in one piece of sub-sample data is different from time corresponding to the frames in the sliding window included in the other pieces of sub-sample data, wherein the mask process refers to leaving the frames, which are not in the sliding window, blank or filling the frames, which are not in the sliding window, in black, and the mask process is performed on the other frames in the pieces of sub-sample data that are not in the sliding window.

10. The augmented reality operating procedure judgment method of claim 8, wherein in response to the plurality of pieces of negative sample data being split into N video segments, the processor generates N−1 pieces of negative sample data, N is a positive integer.

11. The augmented reality operating procedure judgment method of claim 8, wherein:

each time the augmented reality device receives one of the plurality of real-time images, the processor accumulates the received real-time images, and in response to the number of accumulated real-time images reaching a predetermined frame number, the processor inputs the accumulated real-time images into the inference model, and the inference model outputs the standard operating procedure result.

12. The augmented reality operating procedure judgment method of claim 8, wherein the standard operating procedure result output by the inference model comprises a result indicating a correct operation, a result indicating an incorrect operation, or a result indicating insufficient judgment.

13. The augmented reality operating procedure judgment method of claim 9, wherein the processor processes the plurality of pieces of negative sample data and the plurality of pieces of positive sample data by a data augmentation or processes the plurality of pieces of sub-sample data that correspond to the plurality of pieces of negative sample data and the plurality of pieces of positive sample data by the data augmentation, and the processor inputs the pieces of negative sample data and the pieces of positive sample data that have been processed by the data augmentation into the inference model, or the processor inputs the pieces of sub-sample data that correspond to the plurality of pieces of negative sample data and the plurality of pieces of positive sample data and have been processed by the data augmentation into the inference model.

14. The augmented reality operating procedure judgment method of claim 13, wherein the data augmentation comprises augmentation of temporal translation that is performed to randomly translate a temporal position of each frame of at least one of the plurality of video segments.

15. The augmented reality operating procedure judgment method of claim 13, wherein the data augmentation comprises augmentation of temporal zooming that is performed to randomly speed up or slow down a video content of at least one of the plurality of video segments.

16. The augmented reality operating procedure judgment method of claim 9, wherein:

the plurality of pieces of sub-sample data comprise first sub-sample data and second sub-sample data, a first time interval of a first sliding window corresponding to the first sub-sample data overlaps a second time interval of a second sliding window corresponding to the second sub-sample data by M seconds, M is a positive integer, and M seconds is less than the first time interval, and a length of the first time interval is the same as a length of the second time interval, and a starting point of the second time interval is later than a starting point of the first time interval.

17. An augmented reality operating procedure judgment device comprising:

augmented reality glasses receiving a plurality of real-time images; and a processor accessing an inference model stored in a storage device, wherein the processor judges a standard operating procedure (SOP) result corresponding to the plurality of real-time images through the inference model, and wherein the augmented reality glasses display the standard operating procedure result on one of the plurality of real-time images, wherein the processor:

receives a plurality of pieces of positive sample data;

splits the plurality of pieces of positive sample data into a plurality of video segments according to a specific time length;

exchanges any two adjacent video segments of the plurality of video segments to obtain a plurality of pieces of negative sample data; and inputs the plurality of pieces of positive sample data or the plurality of pieces of negative sample data into the inference model for training.

18. The augmented reality operating procedure judgment device of claim 17, wherein before the processor inputs the plurality of pieces of positive sample data or the plurality of pieces of negative sample data into the inference model for training, the processor performs a mask process on the plurality of pieces of positive sample data or the plurality of pieces of negative sample data through a sliding window, wherein the processor generates a plurality of pieces of sub-sample data in chronological order, each piece of sub-sample data includes frames in the sliding window, and time corresponding to the frames in the sliding window included in one piece of sub-sample data is different from time corresponding to the frames in the sliding window included in the other pieces of sub-sample data, and wherein the mask process is performed on the other frames, which are not in the sliding window, in the pieces of sub-sample data, wherein the mask process refers to leaving the frames, which are not in the sliding window, blank or filling the frames, which are not in the sliding window, in black.

* * * * *